United States Patent
Charron

[15] 3,654,724
[45] Apr. 11, 1972

[54] FISHING LURE
[72] Inventor: John R. E. Charron, 91 Sadler Ave., Winnipeg, 8 Manitoba, Canada
[22] Filed: Oct. 21, 1969
[21] Appl. No.: 868,163

[52] U.S. Cl. .......................... 43/42.06, 43/41.2, 43/42.22, 43/42.28, 43/42.49
[51] Int. Cl. ........................................................ A01k 85/00
[58] Field of Search ............... 43/42.06, 42.22, 54.5, 55, 43/57.5, 42.47, 42.35, 42.49, 42.28; 220/38.5

[56] References Cited

UNITED STATES PATENTS

| | | | |
|---|---|---|---|
| 2,791,058 | 5/1957 | Bettini | 43/42.06 |
| 2,994,982 | 8/1961 | Murawski | 43/42.06 X |
| 2,737,312 | 3/1956 | Hamlon | 220/38.5 |
| 2,790,266 | 4/1957 | Williamson | 43/55 |
| 2,486,626 | 11/1949 | Arbogast | 43/42.47 X |
| 2,503,620 | 4/1950 | Larson | 43/42.47 X |

Primary Examiner—Samuel Koren
Assistant Examiner—Daniel J. Leach
Attorney—Kent & Ade

[57] ABSTRACT

A hollow lure with a spring-loaded detachable cap on one end so that lure materials such as blood, liver, worms, etc., together with weights, if desired, can be placed inside the lure. Apertures at the rear permit ingress of water and egress of particles or leached lure materials.

1 Claims, 8 Drawing Figures

PATENTED APR 11 1972 3,654,724

INVENTOR.
JOHN. R. E. CHARRON
BY
Kent & Ade
AGENTS

FISHING LURE

This invention relates to new and useful improvements in fishing lures and has as one of its principal aims and objects, a hollow body within which may be placed lure materials such as liquid and dried blood, liver, beef, fish, cheese, etc., and leached or leaked from the rear of the lure as it is trolled or cast.

A further object of the invention is to provide a device of the character herewithin described which permits the use of live bait such as minnows and worms. In the former case, the body portion of the lure is transparent so that the minnow is clearly visible. In the latter case, worms may be used and means provided to retain the worm therein but permitting the major portion thereof to trail behind the lure.

A yet further object of the invention is to provide a device of the character herewithin described which enables weights to be placed within the lure rather than on the leader or line thus eliminating one of the major causes of snagging.

A yet further object of the invention is to provide a device of the character herewithin described in which the flotation characteristics may be controlled by plugging or unplugging one or more of the apertures within the lure body.

A yet further object of the invention is to provide a device of the character herewithin described which is easily made from plastic and decorated externally as desired.

A yet further object of the invention is to provide a device of the character herewithin described which is simple in construction, economical in manufacture and otherwise well suited to the purpose for which it is designed.

With the foregoing in view, and such other or further purposes, advantages or novel features as may become apparent from consideration of this disclosure and specification, the present invention consists of, and is hereby claimed to reside in, the inventive concept which is comprised, embodied, embraced, or included in the method, process, construction, composition, arrangement or combination of parts, or new use of any of the foregoing, of which concept, one or more specific embodiments of same are herein exemplified as illustrative only of such concept, reference being had to the accompanying figures in which:

In the drawings, like characters of reference indicate corresponding parts in the different figures.

In the present invention, the lures described can be used with a luring material which can dissolve, leach or dispense in water and be expelled behind the lure as it is being trailed through the water. The object, of course, is to attract game fish into the vicinity of the lure.

Such materials include poultry, liver, ground worms, beef, fish, cheese, or dried animal blood or liquid animal blood.

Figure 6:
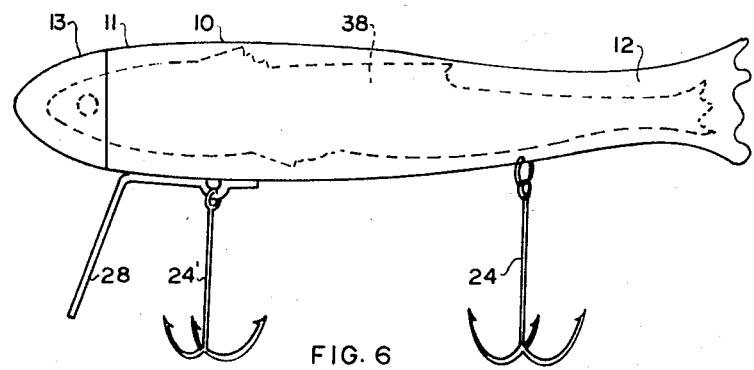
FIG. 6 is a side elevation of a yet further embodiment of the invention.

Alternatively, live bait can be used and in the case of the embodiment shown in FIG. 6, a live or dead minnow can be inserted within the lure. Live worms can also be used and can trail behind the lure, means being provided to prevent the worm from escaping entirely from the lure.

Proceeding therefore to describe the invention in detail, reference character 10 illustrates the lure comprising a hollow, plastic body portion having a front end 11 which is open and a rear end 12 which is closed.

A cap 13 detachably closes off front end 11 of the lure and this cap forms the nose of the lure. It includes a shouldered portion 14 which engages within the open end portion 15 of the body so that the outer surface 16 of the cap is flush with the outer surface 17 of the lure body when in position. This cap is held to the lure by means of a resilient link 18 taking the form of an elastic cord. This cord extends through an aperture (not illustrated) in the rear end 12 of the lure and is knotted at one end as at 19 to retain the cord within the lure body. The other end 20 of the elastic cord is embedded within plastic sealant 21 in the cap 13. The length of the cord is such that the elastic cord normally holds the cap in sealing relationship within the end 11 of the lure body but permits the cap to be displaced to provide access to the interior 22 of the lure body 10.

Adjacent the rear end 12 of the lure body I provide a plurality of relatively small apertures or drillings 23 extending through the wall of the lure body to the interior thereof.

A conventional treble hook element or the equivalent 24 is secured to the underside of the lure body adjacent the rear end 12 thereof and hair or feathers 25 acting as a tail fin secured to the rear end 12. In this connection, the rear end 12 or tail is provided with a longitudinal slit 26 within which the hair or feathers 25 may be glued or otherwise retained.

Adjacent the front end 11 and upon the underside 27 of the lure, I provide a depth-controlling device taking the form of a plate collectively designated 28. This plate includes a securing portion 29 which may be screwed to the underside of the lure by means of screws 30.

A depth-control portion 31 extends downwardly and forwardly from the securing portion 29 and the angulation of this depth-control portion may be varied by bending same, thereby controlling the depth characteristics of the lure. It will be appreciated that these characteristics depend on several factors such as the speed of retrieving or trolling and the weight of the combined lure, hooks, and weights which may be inserted therein as will hereinafter be described.

A loop portion 32 is formed in the securing portion 29 and a further hook element 24' is secured to this loop portion and depends therebelow as clearly shown.

A line-attaching link 33 is secured to the depth-control portion 31 so that fishing line 34 may be secured thereto.

It will of course be appreciated that the external surface of the lure may be decorated in any way desired but this does not form part of the invention.

In operation, the luring material 35 is placed within the lure body by removing the cap 13. This luring material normally will reside adjacent the front end but this is not absolutely necessary, If desired, one or more lead weights 36 may be placed within the lure body to ensure that it reaches the required depth. These weights are normally secured to the leader or line and often are the cause of snags occurring during trolling or retrieving.

The cap is then snapped back into position and is held by the elastic cord 18. During the trolling or retrieving action, water enters the lure through the apertures 23 and leaches the luring material 35 or dissolves same so that it seeps out of one of the apertures 23 and trails behind the lure, thus attacting game fish to the vicinity of the lure.

Figure 1:
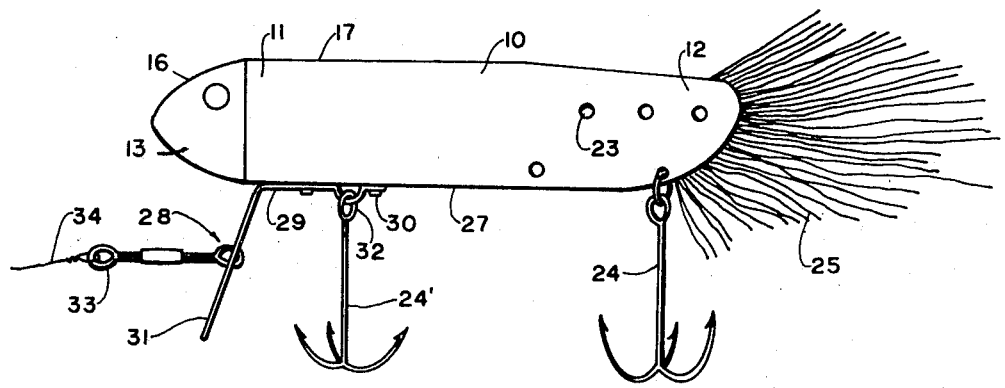
FIG. 1 is a side elevation of one embodiment of my invention.
Figure 2:
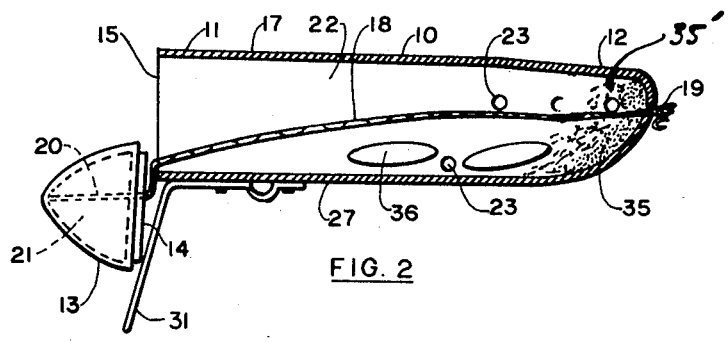
FIG. 2 is a sectional view of FIG. 1 showing the cap displaced for loading purposes.
Figure 3:
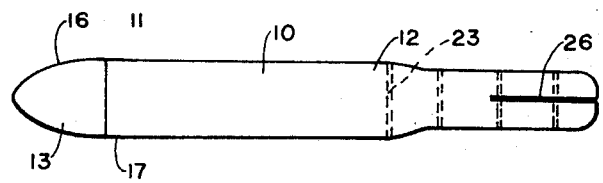
FIG. 3 is a top plan view of FIG. 1.
Figure 4:
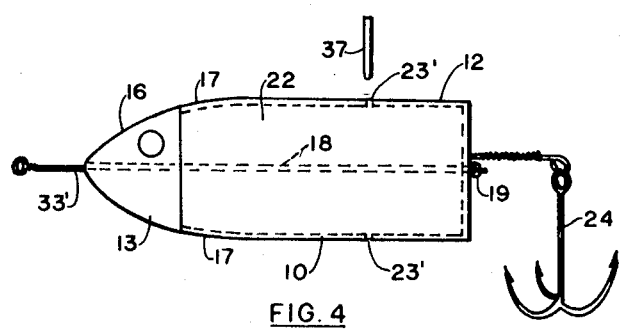
FIG. 4 is a side elevation of an alternative embodiment of my invention.
Figure 5:
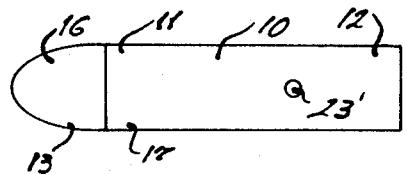
FIG. 5 is a top plan view of FIG. 4.

In the embodiment shown in FIGS. 4 and 5, the line attaching element 33' is secured to the nose or cap 13. This shows a form of jigging plug and one of the aspects of this plug is that I have provided means to control the sinking characteristics thereof. I provide a pair of apertures 23' through the wall thereof diametrically opposite one another and these normally will let water in so that the lure fills with water and will sink fairly rapidly. By plugging one of the apertures 23' by a plugging element 37, the filling of the lure is retarded so that the lure sinks more slowly. By the same token, by plugging both of the apertures 23' the lure will float as water cannot enter. Element 37 may take the form of a plastic or wooden plug or, alternatively, a wooden match may be used for this purpose.

FIG. 6 shows a lure body 10 having a detachable cap 13, said lure body and cap being made of clear plastic. This particular embodiment is shaped in the form of a minnow so that a live or dead minnow 38 may be inserted therein and the color and the appearance thereof clearly shows through the walls of the lure.

Figure 7:
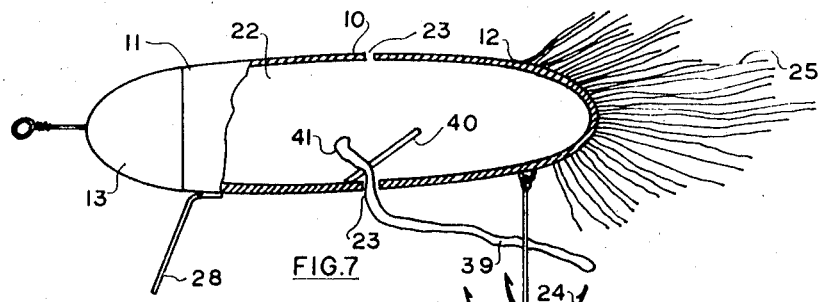
FIG. 7 is a sectional view of one of the lures shown in FIGS. 1 to 5 inclusive showing the use of live bait therein.

Any of the lures hereinbefore described, with the exception of the lure shown in FIG. 6, may be used for live bait such as worms. FIG. 7 shows the lure used with a worm 39. Under these circumstances, the worm works its way through one of the apertures 23 and trails behind the lure thus attracting game fish thereto. However, means are necessary to prevent the worm from escaping and a small pin 40 inserted adjacent one end 41 of the worm, will restrain the worm from escaping entirely from the lure.

Figure 8:
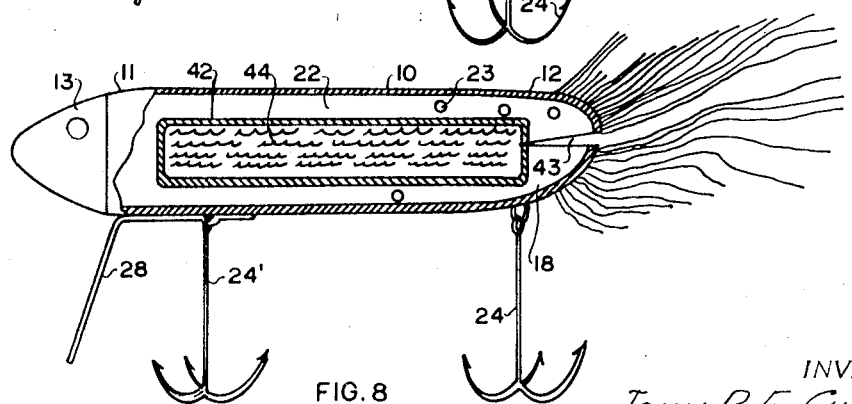
FIG. 8 is a partially sectioned side elevation of a lure having liquid luring material therein.

FIG. 8 shows an embodiment of the lure which is adapted for use with a liquid luring material. Such luring material is preferably retained within a plastic capsule 42 which can be inserted within the lure body in the manner hereinbefore described. A pin or piercing element 43 extends inwardly of the lure body, from the rear end 12 thereof, and as the capsule 42 is inserted, it is pushed against the pin 43, thus piercing the end and allowing the liquid contents 44 to seep from the capsule to the interior of the lure body whereupon it will escape gradually through one of the apertures 23.

It will of course be appreciated that the apertures within the lure body can be of different sizes so that small or large worms can be used as well as small snakes, blood suckers or the like.

It will also be appreciated that when used with the liquid luring material, these apertures should be relatively small in the nature of pin holes so that the rate of escape of the liquid luring material is controlled.

One of the significant features of the device is the fact that bait normally engaged upon the hook of a lure may instead be placed within the lure thus eliminating the rather messy step of endeavouring to engage the bait upon the hook firmly so that it will not become displaced during fishing.

Another important addition to the luring material such as dried blood, includes the incorporation of relatively small flecks of shiny materials such as metallic powders 35, having brilliant surfaces which, when they escape together with the attractant, sparkle in the water thus attracting fish to the vicinity. These flecks or particles can be conventional Day Glo colors or fluorescent colors as desired.

It will also be appreciated, of course, that the cap can be in any position upon the lure providing it supplies access to the interior thereof.

Furthermore, the apertures may be positioned anywhere through the wall of the lure body depending upon the bait and circumstances and, of course, depending upon the size of the lure and whether it is a trolling or casting lure or a jigging type lure. The tail 25 which may be made of hair, feathers, or any convenient material, not only acts as an attractant, but also and more importantly, as a tail fin causing the lure to move from side to side thus increasing its effectiveness. This gives a natural swimming action as well as adding to the attraction of the lure to the game fish being sought.

The elastic cord 18 used to retain the cap, is desirable because all metals which could be used to form springs, corrode rapidly particularly in the presence of blood, water and the like, whereas the elastic or similar material cord is unaffected by such materials.

The lure hereinbefore described is relatively large and is provided with thin but strong walls thus providing considerable space therewithin for the holding of relatively large portions of luring material. Of course, such material can be granulated or in relatively small pieces or in relatively large pieces. If granulated, the apertures within the lure body should be large enough to permit the escape of such granulated materials with which, of course, can be mixed the aforementioned shiny flakes or particles.

However, it is desirable to use dried blood in particle form mixed with shiny flakes or particles.

In operation, the necessary bait or luring material is placed within the lure and the lure is cast or trolled depending upon the circumstances. The lures having the plates 28 should have these plates adjusted for the speed of the boat, the weight of the luring material and any weights which are incorporated therein.

The lures should be retrieved or trolled at a relatively slow rate giving a side-to-side swimming action and a rolling-over action depending upon the rod action.

When casting, a relatively strong line should be used and the plates 28 adjusted so that when the lure is cast out, and just as it hits the surface, a fairly strong pull on the rod will cause the lure to dive and roll over on its side imitating a wounded minnow.

The speed of retrieve should be changed at this point to the minimum allowing the lure to sink a few feet but maintaining the line taut.

By controlling the rod and line action the lure may drop horizontally or at least partially tail down and a steady pull on the rod will cause the necessary action.

This action should be repeated giving a variety of movements to the lure.

When using a jigging type plug as shown in FIG. 7, the lure is manipulated in the usual jigging fashion depending upon circumstances. The plates 28 can be secured at any location on the underside of the lure or can be deleted depending upon circumstances.

Referring back to the flecks or particles 35, these can be metallic or mineral or can be fish scales or skin, etc., ground, chopped or powdered, either in natural color or dyed. They can, of course, be used with other material such as dried or liquid blood or on their own. The apertures in the lure body portion are of a size sufficient to permit the dispensing of such particles therebehind.

Various modifications can be made within the scope of the inventive concept which is herein disclosed and/or claimed.

1. In a fishing lure, the combination of a horizontally elongated hollow body having a closed rear end and an open front end, said body being adapted to contain bait and being provided in the sides thereof with apertures whereby water may circulate through the body and around the bait therein, a removable front end cap constituting a closure for the open front end of the body, an elastic cord extending longitudinally through said body and having its rear end anchored in the rear end of the body, said front end cap being hollow and containing a plastic sealant, the front end portion of said cord being embedded in said sealant whereby to connect the cord to the cap, the length of said cord being such in relation to the length of said body that the cord normally retains said cap in the front end closing position, a depth control plate secured to the underside of the front end portion of said body and extending downwardly and forwardly therefrom, line attachment means connected to said depth control plate, at least one fish hook depending from the underside of the body, the rear end portion of the body being formed with an open-ended vertical slit, and a tuft of fibers adhesively secured in said slit and extending rearwardly therefrom to constitute a tail fin for said body.

* * * * *